US012000413B2

(12) United States Patent
Takakuwa et al.

(10) Patent No.: US 12,000,413 B2
(45) Date of Patent: *Jun. 4, 2024

(54) FLOW RATE CONTROLLER AND DRIVE DEVICE EQUIPPED WITH SAME

(71) Applicant: SMC CORPORATION, Chiyoda-ku (JP)

(72) Inventors: Youji Takakuwa, Kitakatsushika-gun (JP); Akihiro Kazama, Moriya (JP); Hiroyuki Asahara, Tsukuba (JP); Kengo Monden, Ushiku (JP)

(73) Assignee: SMC CORPORATION, Chiyoda-ku (JP)

( * ) Notice: Subject to any disclaimer, the term of this patent is extended or adjusted under 35 U.S.C. 154(b) by 173 days.

This patent is subject to a terminal disclaimer.

(21) Appl. No.: 17/640,724

(22) PCT Filed: Aug. 3, 2020

(86) PCT No.: PCT/JP2020/029601

§ 371 (c)(1),
(2) Date: Mar. 4, 2022

(87) PCT Pub. No.: WO2021/044782

PCT Pub. Date: Mar. 11, 2021

(65) Prior Publication Data

US 2022/0325728 A1 Oct. 13, 2022

(30) Foreign Application Priority Data

Sep. 6, 2019 (JP) ................................ 2019-162907

(51) Int. Cl.
*F15B 15/14* (2006.01)
*F15B 11/072* (2006.01)
(Continued)

(52) U.S. Cl.
CPC .......... *F15B 11/072* (2013.01); *F15B 13/028* (2013.01); *F15B 15/1428* (2013.01);
(Continued)

(58) Field of Classification Search
None
See application file for complete search history.

(56) References Cited

U.S. PATENT DOCUMENTS 2,722,234 A * 11/1955 MacGeorge ........ F15B 13/0402 91/417 R
3,213,886 A * 10/1965 Pearne .................... F15B 11/00 251/285
(Continued)

FOREIGN PATENT DOCUMENTS

JP 4-48404 U 4/1992
JP 5-106605 A 4/1993
(Continued)

OTHER PUBLICATIONS

International Search Report dated Oct. 13, 2020 in PCT/JP2020/029601 filed Aug. 3, 2020, 2 pages.

*Primary Examiner* — Matthew W Jellett
(74) *Attorney, Agent, or Firm* — Oblon, McClelland, Maier & Neustadt, L.L.P.

(57) ABSTRACT

A flow rate controller and a drive device are provided with a cylinder flow passage connected to an air cylinder; a main flow passage for supplying air to and discharging air from the air cylinder; an auxiliary flow passage that has a first throttle valve and through which exhaust air discharged from the air cylinder passes with a smaller flow rate than that of the main flow passage; a switch valve that switches between a first position in which the cylinder flow passage communicates with the main flow passage and a second position in which the cylinder flow passage communicates with the auxiliary flow passage; and a pilot air adjustment
(Continued)

part that guides a portion of the exhaust air from the air cylinder as pilot air to the switch valve.

6 Claims, 7 Drawing Sheets

(51) Int. Cl.
*F15B 13/02* (2006.01)
*F15B 15/22* (2006.01)
*F15B 13/04* (2006.01)

(52) U.S. Cl.
CPC ........ *F15B 15/1447* (2013.01); *F15B 15/226* (2013.01); *F15B 13/0402* (2013.01); *F15B 2211/329* (2013.01); *F15B 2211/6355* (2013.01)

(56) References Cited

U.S. PATENT DOCUMENTS

| | | | | | |
|---|---|---|---|---|---|
| 3,874,405 | A * | 4/1975 | Thayer | F15B 13/0438 | 137/625.62 |
| 4,067,357 | A * | 1/1978 | Ruchser | F15B 13/0405 | 137/596.18 |
| 5,349,151 | A * | 9/1994 | Eisbrenner | F15B 11/022 | 91/461 |
| 6,109,291 | A * | 8/2000 | Yoshimura | F15B 13/043 | 137/854 |
| 6,167,901 | B1 * | 1/2001 | Yoshinura | F15B 13/0402 | 137/854 |
| 6,427,720 | B1 * | 8/2002 | Hayashi | F15B 13/0402 | 137/557 |
| 6,732,761 | B2 * | 5/2004 | Bento | F16K 31/426 | 137/625.64 |
| 6,848,641 | B2 * | 2/2005 | Lohmann | F15B 11/003 | 242/129 |
| 8,464,753 | B2 * | 6/2013 | Schmidt | H01H 33/55 | 137/596.14 |
| 9,797,117 | B2 * | 10/2017 | Kubo | F15B 13/01 | |
| 10,760,318 | B2 * | 9/2020 | Fortmann | E05F 15/50 | |
| 11,339,806 | B2 * | 5/2022 | Nishimura | F15B 11/044 | |
| 11,519,430 | B2 * | 12/2022 | Takakuwa | F15B 11/04 | |
| 11,773,879 | B2 * | 10/2023 | Takakuwa | F15B 11/06 | 91/525 |
| 2022/0325728 | A1 * | 10/2022 | Takakuwa | F15B 21/10 | |
| 2022/0333622 | A1 * | 10/2022 | Takakuwa | F15B 15/1433 | |
| 2022/0349426 | A1 * | 11/2022 | Takakuwa | F15B 15/204 | |

FOREIGN PATENT DOCUMENTS

| | | | |
|---|---|---|---|
| JP | 2000-199503 | A | 7/2000 |
| JP | 5578502 | B2 | 8/2014 |
| JP | 2016-161055 | A | 9/2016 |
| JP | 2016-205431 | A | 12/2016 |

* cited by examiner

FLOW RATE CONTROLLER AND DRIVE DEVICE EQUIPPED WITH SAME

TECHNICAL FIELD

The present invention relates to a flow rate controller for an air cylinder, and a drive device equipped with the flow rate controller.

BACKGROUND ART

Conventionally, a shock absorbing mechanism has been used in which a cushioning material made of a soft resin such as rubber or urethane or the like, or an oil damper or the like is attached to an end part of an air cylinder, to thereby cushion an impact at a stroke end. However, such a shock absorbing mechanism that mechanically mitigates shocks in the cylinder is limited in terms of the number of operations it can perform, and requires regular maintenance.

In order to resolve such incompatibility, in JP 5578502 B2, a speed controller (flow rate controller) is disclosed in which, by throttling the exhaust air that is discharged from the air cylinder in the vicinity of a stroke end, an operating speed of the air cylinder is reduced.

SUMMARY OF THE INVENTION

In such a conventional flow rate controller, the pilot air is gradually discharged through the throttle valve, and when the pilot pressure falls below a predetermined value, the switching valve performs a switching operation to throttle the exhaust air. However, it has been determined that when the pressure acting on the throttle valve falls below a predetermined pressure, the flow of the pilot air passing through the throttle valve may rapidly decrease, and the timing of the switching operation becomes unstable.

Therefore, an aspect of the present invention has the object of providing a flow rate controller, which is capable of stabilizing a timing of a switching operation, and a drive device equipped with such a flow rate controller.

One aspect of the present invention is characterized by a flow rate controller, comprising a cylinder flow path communicating with a port of an air cylinder, a main flow path configured to supply and discharge air to and from the cylinder flow path, an auxiliary flow path disposed in parallel with the main flow path and including a first throttle valve configured to throttle a flow rate of the air to a flow rate less than that in the main flow path, a switching valve connected to the cylinder flow path, the main flow path, and the auxiliary flow path, and configured to be switched between a first position in which the cylinder flow path is allowed to communicate with the main flow path, and a second position in which the cylinder flow path is allowed to communicate with the auxiliary flow path, and a pilot air adjustment part configured to guide a portion of exhaust air in the cylinder flow path to the switching valve as pilot air, wherein the pilot air adjustment part includes a second throttle valve configured to regulate an inflowing speed at which the pilot air flows into the switching valve, and the switching valve is switched from the first position to the second position due to a rise in a pressure of the pilot air.

Another aspect of the present invention is characterized by a drive device, comprising: a high pressure air supply source configured to supply high pressure air to an air cylinder; an exhaust port configured to discharge exhaust air of the air cylinder; a flow rate controller including a cylinder flow path communicating with a port of the air cylinder, a main flow path configured to supply and discharge air to and from the cylinder flow path, an auxiliary flow path disposed in parallel with the main flow path and including a first throttle valve configured to throttle a flow rate of the air to a flow rate less than that in the main flow path, a switching valve connected to the cylinder flow path, the main flow path, and the auxiliary flow path, and configured to be switched between a first position in which the cylinder flow path is allowed to communicate with the main flow path, and a second position in which the cylinder flow path is allowed to communicate with the auxiliary flow path, a pilot air adjustment part configured to guide a portion of the exhaust air in the cylinder flow path to the switching valve as pilot air; and an operation switching valve connected to one end of the high pressure air supply source, one end of the exhaust port, and one end of the main flow path, and configured to switch and thereby allow either the high pressure air supply source or the exhaust port to communicate with the main flow path, wherein the pilot air adjustment part includes a second throttle valve configured to regulate an inflowing speed at which the pilot air flows into the switching valve, and the switching valve is switched from the first position to the second position due to a rise in a pressure of the pilot air.

In accordance with the flow rate controller and the drive device comprising the same according to the above-described aspects, it is possible to stabilize the timing of the switching operation.

DESCRIPTION OF THE INVENTION

Hereinafter, a preferred embodiment of the present invention will be presented and described in detail below with reference to the accompanying drawings.

Figure 1:
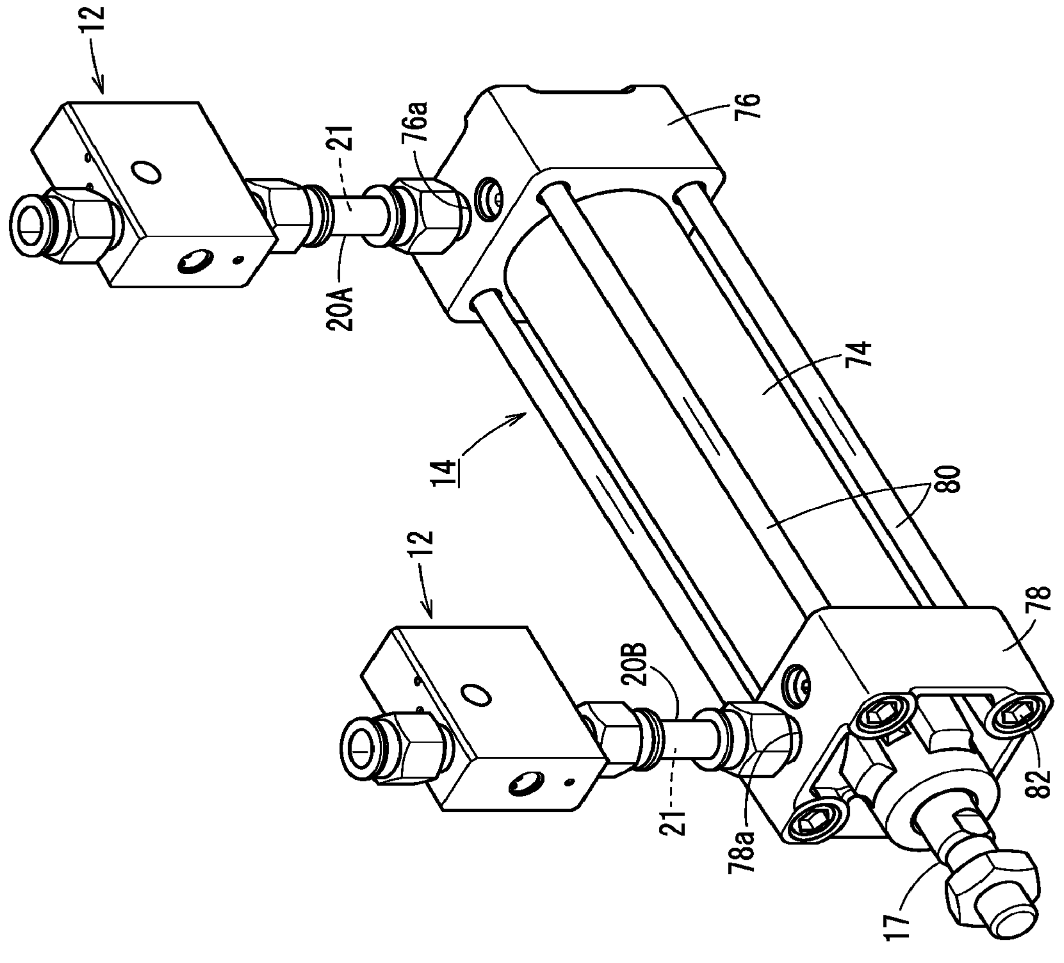
FIG. 1 is a perspective view of an air cylinder in which a flow rate controller according to an embodiment is mounted.

As shown in FIG. 1, an air cylinder 14 is a double acting cylinder that is used in an automated equipment line or the like. The air cylinder 14 is equipped with a cylindrical cylinder tube 74, a head cover 76 that seals a head side end part of the cylinder tube 74, and a rod cover 78 that seals a rod side end part of the cylinder tube 74. The cylinder tube 74, the head cover 76, and the rod cover 78 are tightened and connected in an axial direction by a plurality of connecting rods 80 and fixing bolts 82.

Figure 2:
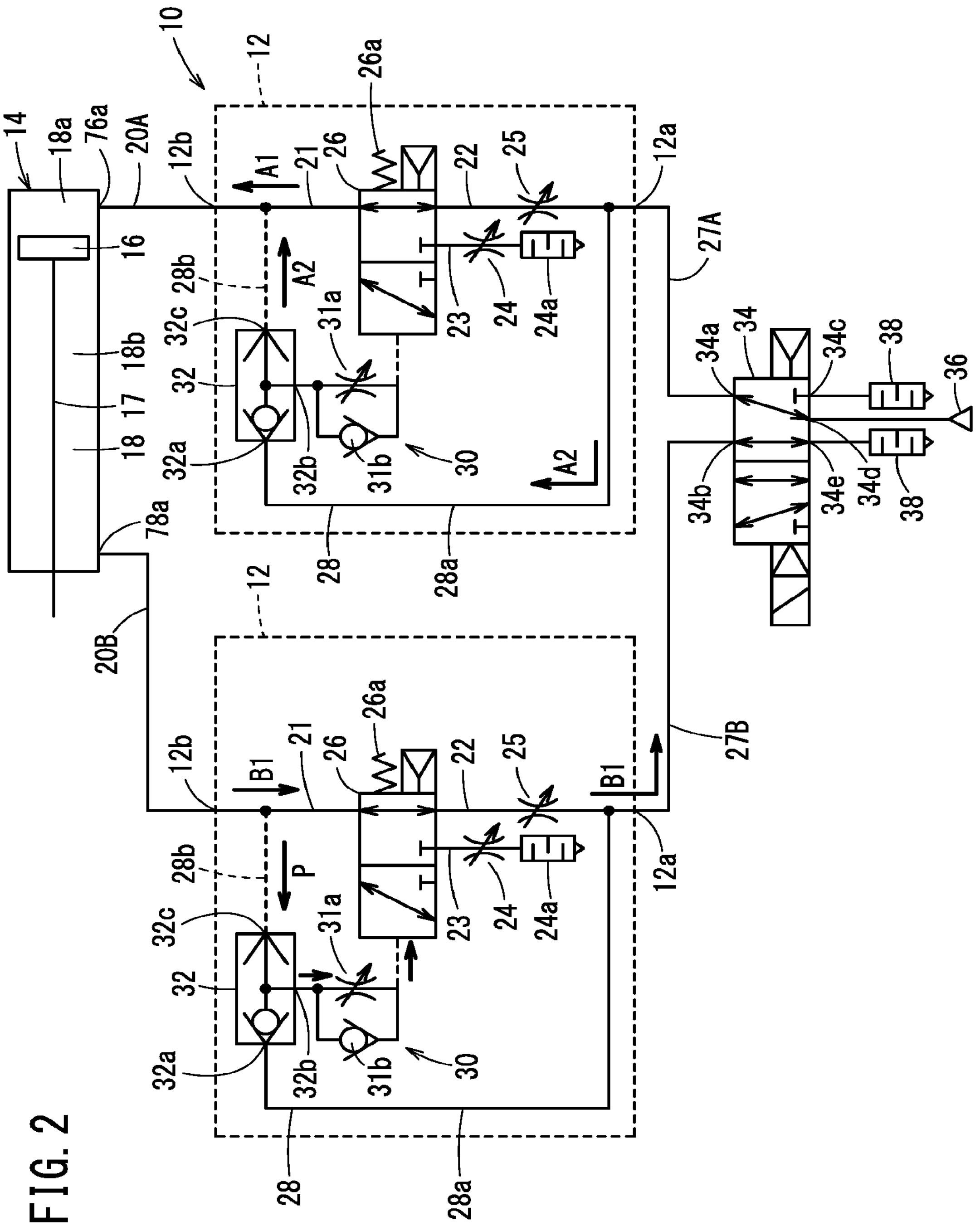
FIG. 2 is a fluid circuit diagram of the flow rate controller and a drive device according to the embodiment.

In the interior of the cylinder tube 74, as shown in FIG. 2, there are provided a piston 16 that partitions a cylinder chamber 18, and a piston rod 17 connected to the piston 16. A head side port 76*a* is provided in a head side pressure chamber 18*a* on a head side of the piston 16, and a rod side port 78*a* is provided in a rod side pressure chamber 18*b* on a rod side of the piston 16. As shown in FIG. 1, the head side port 76*a* is provided in the head cover 76, and the rod side port 78*a* is provided in the rod cover 78.

As shown in FIG. 2, the air cylinder 14 is driven by a drive device 10, which includes a head side flow rate controller 12 and a rod side flow rate controller 12, an operation switching valve 34, and a high pressure air supply source 36. As shown in FIG. 1, the head side flow rate controller 12 is connected via a head side pipe 20A to the head side port 76*a* of the air cylinder 14, and the rod side flow rate controller 12 is connected via a rod side pipe 20B to the rod side port 78*a*. The head side pipe 20A and the rod side pipe 20B are included in a cylinder flow path 21 that allows the air cylinder 14 and the flow rate controller 12 to communicate with each other, and introduction of high pressure air into the air cylinder 14 and discharging of air from the air cylinder 14 are carried out via the cylinder flow path 21.

As shown in FIG. 2, the head side flow rate controller 12 includes a main flow path 22 connected to the cylinder flow path 21, an auxiliary flow path 23 disposed in parallel with the main flow path 22, and a bypass flow path 28 that connects the main flow path 22 and the cylinder flow path 21. A switching valve 26 is connected between the main flow path 22 and the auxiliary flow path 23, and the cylinder flow path 21. The switching valve 26 is a so-called three-way valve, and is connected to the cylinder flow path 21, the main flow path 22, and the auxiliary flow path 23. A third throttle valve 25 for adjusting the flow rate of the air is provided in the main flow path 22. The third throttle valve 25, by variably regulating the flow rate of the exhaust air that flows through the main flow path 22, makes it possible to adjust the operating speed of the air cylinder 14.

On the other hand, a first throttle valve 24, which variably regulates the flow rate of the exhaust air flowing through the auxiliary flow path 23, is provided in the auxiliary flow path 23. The first throttle valve 24 is configured to throttle the flow rate of the exhaust air more strongly than the third throttle valve 25 of the main flow path 22. An exhaust port 24*a* is connected to a downstream side of the first throttle valve 24, and the exhaust air that has passed through the first throttle valve 24 is discharged from the exhaust port 24*a*.

One end of the bypass flow path 28 is connected to the main flow path 22 between the third throttle valve 25 and a valve port 12*a*, whereas the other end thereof is connected to the cylinder flow path 21, to connect the main flow path 22 and the cylinder flow path 21 while bypassing the third throttle valve 25 and the switching valve 26. The bypass flow path 28 is provided with a shuttle valve 32, which includes a first inlet 32*a*, a second inlet 32*b*, and an outlet 32*c*. A first portion 28*a* of the bypass flow path 28 is connected to the first inlet 32*a* of the shuttle valve 32, a second portion 28*b* of the bypass flow path 28 is connected to the outlet 32*c*, and the switching valve 26 is connected via a pilot air adjustment part 30 to the second inlet 32*b*.

When a pressure in the main flow path 22 becomes higher than a pressure in the cylinder flow path 21, the shuttle valve 32 closes the second inlet 32*b* and allows the first inlet 32*a* and the outlet 32*c* to communicate with each other to introduce the high pressure air of the main flow path 22 into the cylinder flow path 21 through the bypass flow path 28. Further, when the pressure in the main flow path 22 becomes lower than the pressure in the cylinder flow path 21, the shuttle valve 32 closes the first inlet 32*a* and allows the second inlet 32*b* and the outlet 32*c* to communicate with each other to guide the exhaust air in the cylinder flow path 21 to the pilot air adjustment part 30 as pilot air.

The pilot air adjustment part 30 is disposed between the second inlet 32*b* of the shuttle valve 32 and the switching valve 26. The pilot air adjustment part 30 includes a second throttle valve 31*a*, and a check valve 31*b* which is connected in parallel with the second throttle valve 31*a*. A downstream side of the second throttle valve 31*a* and the check valve 31*b* is connected to a later-described piston member 45 (see FIG. 4) of the switching valve 26. The pilot air that has passed through the second throttle valve 31*a* drives the switching valve 26, and switches the switching valve 26 from a first position, in which the exhaust air flows from the cylinder flow path 21 to the main flow path 22, to a second position, in which the exhaust air flows from the cylinder flow path 21 to the auxiliary flow path 23 (refer to the switching valve 26 on the left side of FIG. 7).

The check valve 31*b* is connected in a direction that allows passage of air flowing from the switching valve 26 to the shuttle valve 32. When the pressure of the exhaust air in the cylinder flow path 21 decreases, the check valve 31*b* causes the pilot air in the switching valve 26 to be discharged to the cylinder flow path 21 side. Accompanying discharging of the pilot air, the switching valve 26 is returned from the second position to the first position by the elastic force of a return spring 26*a* of the switching valve 26.

Since the rod side flow rate controller 12, which is connected to the rod side pipe 20B, is configured in substantially the same manner as the head side flow rate controller 12, constituent elements thereof which are the same as the constituent elements of the head side flow rate controller 12 are designated by the same reference numerals, and detailed description thereof is omitted.

Next, a description will be given concerning the configuration of the operation switching valve 34 that is connected to the head side flow rate controller 12 and the rod side flow rate controller 12. One end of a third pipe 27A is connected to the valve port 12*a* of the head side flow rate controller 12, and one end of a fourth pipe 27B is connected to the valve port 12*a* of the rod side flow rate controller 12. The operation switching valve 34 is connected to another end of the third pipe 27A and another end of the fourth pipe 27B.

The operation switching valve 34 is a 5-port valve that electrically switches a connection destination of the high pressure air, and includes first through fifth ports 34*a* to 34*e*. The first port 34*a* is connected to the third pipe 27A, and the second port 34*b* is connected to the fourth pipe 27B. The third port 34*c* and the fifth port 34*e* are connected to exhaust ports 38, and the fourth port 34*d* is connected to the high pressure air supply source 36.

At a first position shown in FIG. 2, the operation switching valve 34 allows the first port 34*a* and the fourth port 34*d* to communicate with each other, and allows the second port 34*b* and the fifth port 34*e* to communicate with each other. In this manner, the operation switching valve 34 allows the high pressure air supply source 36 to communicate with the head side port 76*a*, and allows the exhaust port 38 to communicate with the rod side port 78*a*.

Further, at a second position, the operation switching valve 34 allows the first port 34*a* and the third port 34*c* to communicate with each other, and allows the second port 34*b* to communicate with the fourth port 34*d*. In this manner, the operation switching valve 34 allows the high pressure air supply source 36 to communicate with the rod side port 78*a*, and allows the exhaust port 38 to communicate with the head side port 76*a*.

A circuit configuration of the drive device 10 according to the present embodiment is configured in the manner described above. A description will be given below concerning a specific structure of the flow rate controller 12.

Figure 3A:
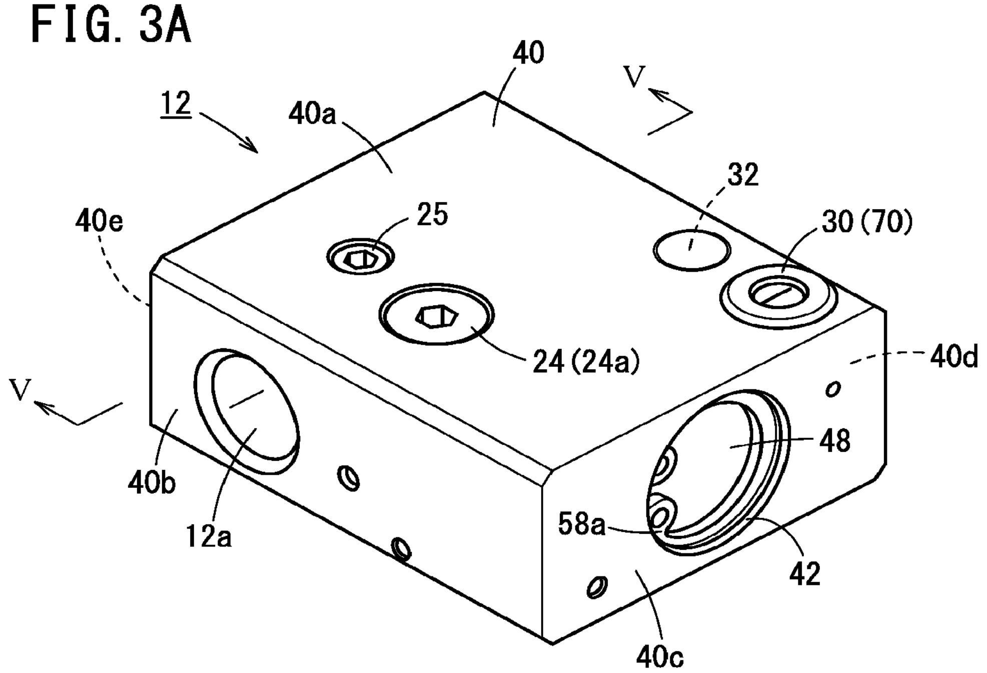
FIG. 3A is a perspective view showing the flow rate controller of FIG. 1 from the side of a valve port.
Figure 3B:
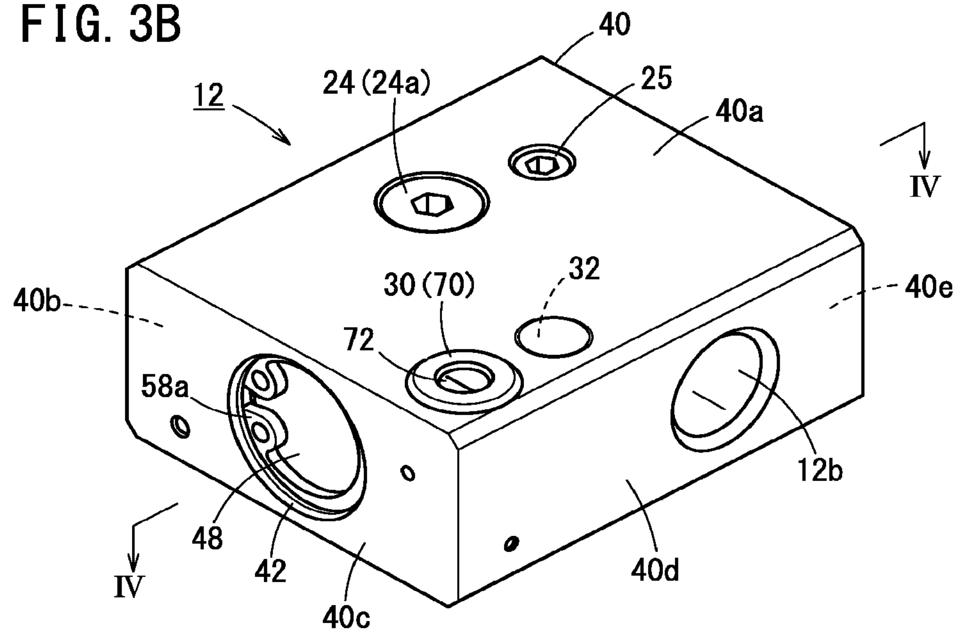
FIG. 3B is a perspective view showing the flow rate controller of FIG. 1 from the side of a cylinder port.
Figure 5:
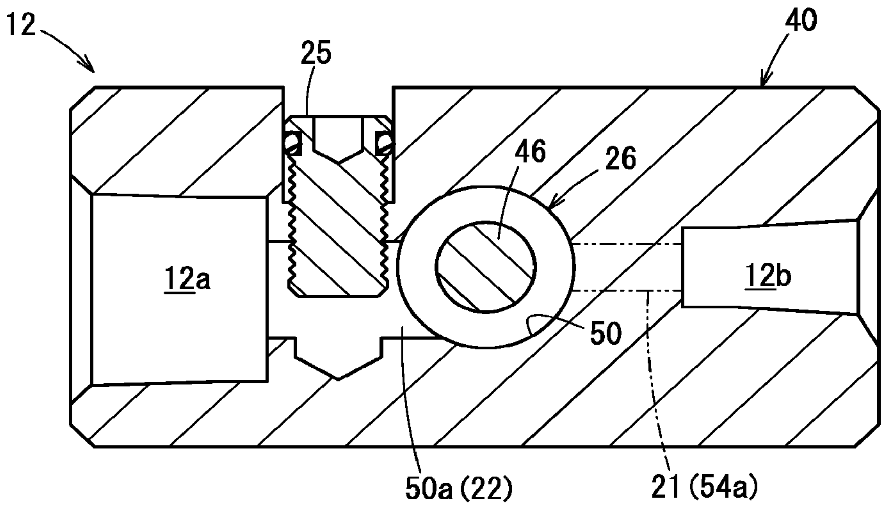
FIG. 5 is a cross-sectional view showing a cross section that is cut parallel to a side surface at a position taken along V-V line of FIG. 3A.

As shown in FIGS. 3A and 3B, the flow rate controller 12 includes a flat box-shaped housing 40. The housing 40 has, incorporated therein, the cylinder flow path 21, the main flow path 22, the auxiliary flow path 23, the bypass flow path 28, the first throttle valve 24, the switching valve 26, the pilot air adjustment part 30, the third throttle valve 25, and the shuttle valve 32. A plurality of holes are formed on an upper surface 40*a* of the housing 40, and the first throttle valve 24, the third throttle valve 25, the pilot air adjustment part 30, and the shuttle valve 32 are inserted into such holes. As shown in FIG. 5, the third throttle valve 25 is made up from a needle valve provided midway along an internal flow path 50*a* (main flow path 22) connecting the valve port 12*a* and the switching valve 26, and is capable of variably adjusting the flow rate by an adjustment screw on an upper end thereof being rotated.

Figure 6:
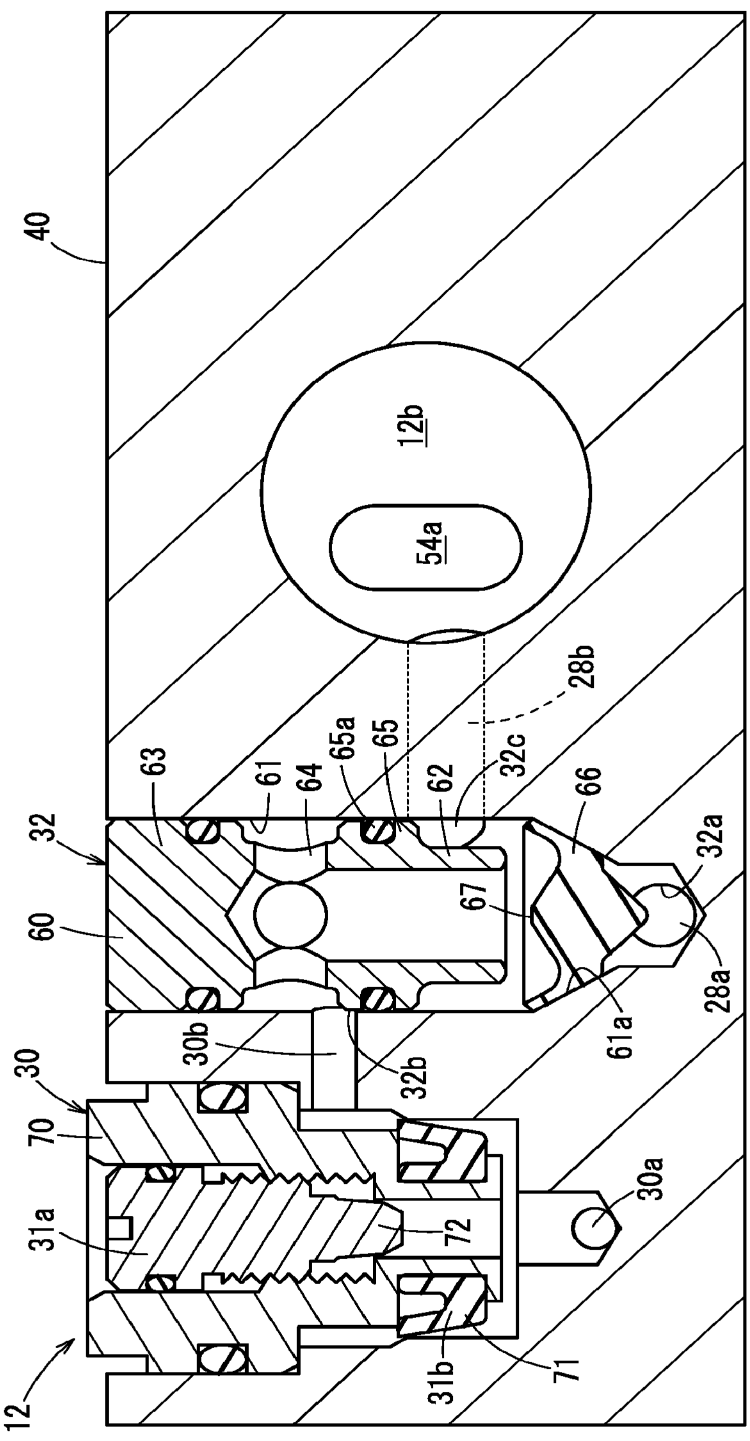
FIG. 6 is a cross-sectional view showing a cross section that is cut parallel to a front surface at a position taken along line VI-VI of FIG. 4.

As shown in FIG. 6, the pilot air adjustment part 30 is constituted by a check valve equipped throttle valve 70 in which the check valve 31*b* and the second throttle valve 31*a* are formed integrally. By rotating a screw mechanism 72, the flow rate of the second throttle valve 31*a* is capable of being changed. Further, the check valve 31*b* is equipped with an elastic valve member 71, and allows passage of the air flowing from an internal flow path 30*a* to an internal flow path 30*b*, and prevents the flow of the air in the opposite direction.

The shuttle valve 32 includes a shuttle valve installation hole 61 having an inclined portion 61*a*, a distal end of which is reduced in diameter in a tapered shape. The first inlet 32*a* of the shuttle valve 32 is formed on the inclined portion 61*a*, on a side portion of the shuttle valve installation hole 61. Further, the second inlet 32*b* of the shuttle valve 32 is formed at a position higher than the first inlet 32*a*, on a side portion of the shuttle valve installation hole 61. Further, the outlet 32*c* of the shuttle valve 32 is formed at a lower end part of the shuttle valve installation hole 61.

The shuttle valve 32 further includes a flow path member 60 that is inserted into the shuttle valve installation hole 61, and a valve element 66 disposed between the flow path member 60 and the inclined portion 61*a*. The flow path member 60 includes, at an upper end thereof, a sealing portion 63 formed with an inner diameter that is substantially the same as the inner diameter of the shuttle valve installation hole 61. The sealing portion 63 seals an upper end part of the shuttle valve installation hole 61. A tube portion 62 extends from the sealing portion 63 of the flow path member 60 toward the lower end of the shuttle valve installation hole 61.

The tube portion 62 is a tubular member having a diameter smaller than the inner diameter of the shuttle valve installation hole 61, and a lower end part (distal end part) of the tube portion 62 opens in the vicinity of the outlet 32*c*, and further, a ventilation hole 64, which penetrates through the tube portion 62 in a radial direction, is formed in the vicinity of a proximal end part of the tube portion 62. Further, a partition member 65 and a gasket 65*a*, which are in close contact with the shuttle valve installation hole 61, are provided in an outer peripheral portion of the tube portion 62, at a portion between the outlet 32*c* and the second inlet 32*b*. The partition member 65 and the gasket 65*a* airtightly separate the second inlet 32*b* and the outlet 32*c* on an outer side of the tube portion 62.

The valve element 66 is made up from an elastic member, is formed in a substantially conical plate shape that is convex downward, and has a substantially V-shaped cross section. A lower end side of the valve element 66 has an inclined surface that can be brought into close contact with the inclined portion 61*a*. A conically-shaped protruding part 67, which can be inserted into the tube portion 62, is formed at an upper end central portion of the valve element 66. At the position shown in FIG. 6, the lower end side of the valve element 66 is in close contact with the inclined portion 61*a*, and airtightly seals the first inlet 32*a* and the outlet 32*c* while allowing the second inlet 32*b* and the outlet 32*c* to communicate with each other. When a pressure on the first inlet 32*a* side increases, the valve element 66 rises, whereby the protruding part 67 is inserted into the tube portion 62 and the valve element 66 covers the tube portion 62. In this state, the valve element 66 closes the inner side of the tube portion 62 to block communication between the second inlet 32*b* and the outlet 32*c*, and at the same time, the outer peripheral portion of the valve element 66 is elastically deformed along the flow direction of the air, whereby the first inlet 32*a* and the outlet 32*c* are allowed to communicate with each other. More specifically, when the valve element 66 is displaced upward, the shuttle valve 32 places the first portion 28*a* and the second portion 28*b* of the bypass flow path 28 in communication.

Figure 4:
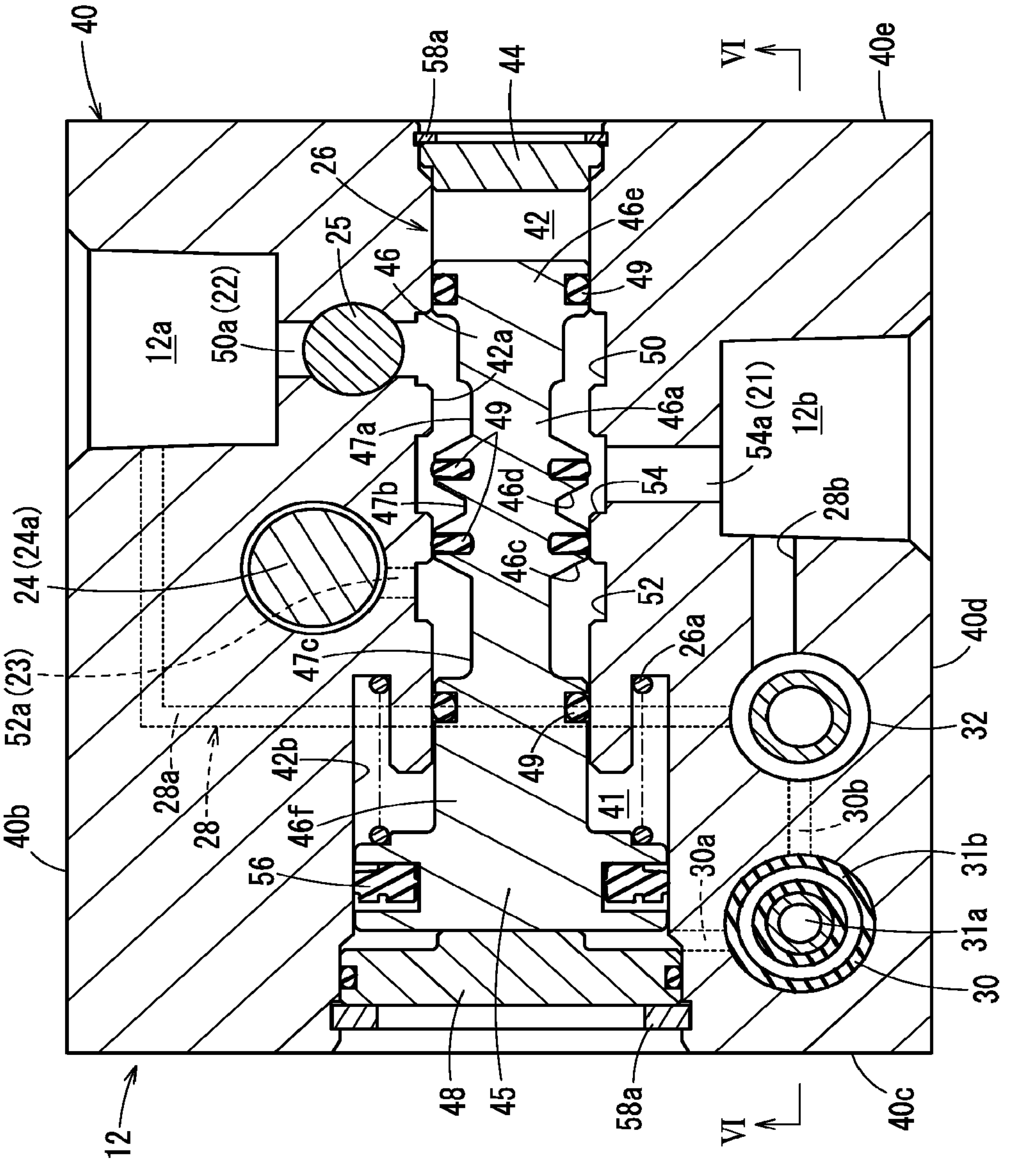
FIG. 4 is a cross-sectional view showing a cross section that is cut parallel to an upper surface at a position taken along line IV-IV of FIG. 3B.

The first inlet 32*a* of the shuttle valve 32 communicates with the valve port 12*a* (main flow path 22) shown in FIG. 4 through the first portion 28*a* of the bypass flow path 28. Further, as shown in FIG. 6, the second inlet 32*b* of the shuttle valve 32 communicates with the adjacent pilot air adjustment part 30 through the internal flow path 30*b*. Furthermore, the outlet 32*c* communicates with a cylinder port 12*b* (cylinder flow path 21) through the second portion 28*b* of the bypass flow path 28.

On the other hand, as shown in FIG. 3A, the first throttle valve 24 and the exhaust port 24*a* are configured in the form of an exhaust throttle valve in which these members are formed integrally, and the exhaust air is discharged therethrough from the upper surface 40*a* side shown in the drawing. By rotating a needle adjustment screw that is exposed on the upper surface 40*a*, the flow rate of the first throttle valve 24 can be changed.

The cylinder port 12*b* for connecting the head side pipe 20A or the rod side pipe 20B on the air cylinder 14 side is formed on a rear surface 40*d* of the housing 40. The valve port 12*a* for connecting the third pipe 27A or the fourth pipe 27B is formed on a front surface 40*b* (see FIG. 3B) of the housing 40. Further, a spool guide hole 42 is formed so as to penetrate from one side surface 40*c* to another side surface 40*e* of the housing 40. The switching valve 26 is disposed in the spool guide hole 42.

As shown in FIG. 4, the switching valve 26 is configured in the form of a spool valve equipped with the spool guide hole 42, and a spool 46 that is accommodated in the spool guide hole 42. The spool guide hole 42 includes a spool guide portion 42*a* formed with a relatively small inner diameter, and a piston accommodating portion 42*b* formed with an inner diameter larger than that of the spool guide portion 42*a*. The spool guide hole 42 is sealed by a cap 44 that closes an end part on the spool guide portion 42*a* side, and a cap 48 that closes an end part on the piston accommodating portion 42*b* side. The cap 44 and the cap 48 are each fixed in the spool guide hole 42 by retaining clips 58*a*.

A first communication groove 50, a second communication groove 52, and a third communication groove 54, which are formed by expanding the entire circumference of the inner diameter in groove-like shapes, are formed in the spool guide portion 42*a*. The first communication groove 50 is formed closest to the cap 44, and communicates with the valve port 12*a* via the internal flow path 50*a*. The second communication groove 52 is a groove that is formed at a portion closer to the piston member 45, and communicates with the first throttle valve 24 and the exhaust port 24*a* via an internal flow path 52*a*. The third communication groove 54 is a groove that is formed between the first communication groove 50 and the second communication groove 52, and communicates with the cylinder port 12*b* via an internal flow path 54*a*.

The piston accommodating portion 42*b* is formed with a diameter larger than that of the spool guide portion 42*a*, and a piston chamber 41 is formed in the interior thereof. The piston chamber 41 accommodates the piston member 45 of the spool 46. The return spring 26*a* that biases the piston member 45 toward the side surface 40*c* side and returns the piston member 45 to the first position is provided on the side surface 40*e* side of the piston chamber 41. The internal flow path 30*a* opens on the side surface 40*c* side of the piston chamber 41. The internal flow path 30*a* communicates with the pilot air adjustment part 30.

The spool 46 is arranged to be capable of sliding in the spool guide hole 42 in an axial direction perpendicular to the side surfaces 40*c* and 40*e*. On the side surface 40*e* side of the spool 46, there is provided a spool portion 46*a* that is inserted inside the spool guide hole 42, and on the side surface 40*c* side of the spool 46, there is provided the piston member 45 that drives the spool 46. The piston member 45 has a diameter that is larger than that of the spool portion 46*a*, and is accommodated in the piston chamber 41. A packing 56 is installed on an outer peripheral portion of the piston member 45, and the packing 56 partitions the piston chamber 41 in an airtight manner into a vacant chamber on the side surface 40*c* side, and a vacant chamber on the side surface 40*e* side.

The spool portion 46*a* includes guide end parts 46*e* and 46*f* at both ends thereof in the axial direction. The guide end parts 46*e* and 46*f* are formed with an outer diameter that is slightly smaller than the inner diameter of the spool guide portion 42*a*, and guide the movement of the spool 46 in the axial direction. Packings 49 are provided respectively on the guide end parts 46*e* and 46*f*, in order to prevent air from leaking along the axial direction. Between the above-described guide end parts 46*e* and 46*f*, there are formed a first sealing wall 46*c*, a second sealing wall 46*d*, and recesses 47*a*, 47*b*, and 47*c*.

The first sealing wall 46*c* and the second sealing wall 46*d* are formed with outer diameters that are slightly smaller than the inner diameter of the spool guide portion 42*a*, and include the packings 49 on the outer peripheral portion thereof. At the first position shown in FIG. 4, the first sealing wall 46*c* is formed at a position in close contact with the inner wall of the spool guide portion 42*a* between the second communication groove 52 and the third communication groove 54, and blocks communication between the second communication groove 52 and the third communication groove 54. On the other hand, the second sealing wall 46*d* is provided so as to be separated away from the first sealing wall 46*c* toward the side surface 40*e* side, and at the first position, is positioned inside the third communication groove 54, and allows communication between the third communication groove 54 and the first communication groove 50.

At the second position of the spool 46, the second sealing wall 46*d* is in close contact with the inner peripheral surface of the spool guide portion 42*a* between the third communication groove 54 and the first communication groove 50, and blocks communication between the third communication groove 54 and the first communication groove 50. Moreover, the first sealing wall 46*c* is positioned inside the third communication groove 54 at the second position, and allows communication between the third communication groove 54 and the second communication groove 52.

The recess 47*a* is formed between the second sealing wall 46*d* and the guide end part 46*e*, and at the first position of the spool 46, forms a flow path having a large cross-sectional area in order to facilitate the passage of air between the first communication groove 50 and the third communication groove 54. The recess 47*b* is formed between the first sealing wall 46*c* and the second sealing wall 46*d*. Further, the recess 47*c* is formed between the first sealing wall 46*c* and the guide end part 46*f*, and at the second position of the spool 46, forms a flow path having a large cross-sectional area between the second communication groove 52 and the third communication groove 54.

The specific structure of the flow rate controller 12 is configured in the manner described above. Hereinafter, a description will be given concerning actions of the drive device 10 of the present embodiment together with operations thereof. In this instance, with reference to FIGS. 2 and 7, a description will be given as an example of an operating stroke for moving the piston 16 toward the rod side port 78*a*.

As shown in FIG. 2, in the operating stroke, the operation switching valve 34 is switched to the first position, and the high pressure air supply source 36 communicates with the third pipe 27A. The high pressure air flows into the head side flow rate controller 12 through the valve port 12*a*. In the flow rate controller 12, the high pressure air flows into the main flow path 22 and the bypass flow path 28. The switching valve 26 is placed in the first position, which is an initial position, and as shown by the arrow A1, the high pressure air in the main flow path 22 flows into the cylinder flow path 21 through the switching valve 26.

Further, in the bypass flow path 28, the pressure in the first portion 28*a* becomes higher than the pressure in the second portion 28*b*. Therefore, the valve element 66 of the shuttle valve 32 shown in FIG. 6 is pushed upward toward an upper end side, whereby the first inlet 32*a* and the outlet 32*c* communicate with each other, and the first portion 28*a* and the second portion 28*b* of the bypass flow path 28 are placed in communication. Accordingly, as shown by the arrow A2 in FIG. 2, the high pressure air flows into the cylinder flow path 21 via the bypass flow path 28. Since there is no throttle valve in the bypass flow path 28, the high pressure air is introduced in a free flowing manner into the head side port 76*a* of the air cylinder 14.

On the other hand, the exhaust air, which is discharged from the rod side pressure chamber 18*b*, flows into the rod side flow rate controller 12 via the rod side pipe 20B. The exhaust air flows in from the cylinder port 12*b* of the flow rate controller 12. The rod side switching valve 26 is in the first position, the cylinder flow path 21 and the main flow path 22 communicate with each other, and as shown by the arrow B1, the exhaust air is discharged from the exhaust port 38 through the main flow path 22. At that time, the flow rate of the exhaust air is throttled by the third throttle valve 25, and the operating speed of the piston 16 of the air cylinder 14 is regulated by the third throttle valve 25. In this manner, the flow rate controller 12 constitutes a meter-out speed controller, which regulates the operating speed of the piston 16 by the exhaust air that is discharged from the air cylinder 14.

Further, in the rod side flow rate controller 12, as shown by the arrow P, a portion of the exhaust air flows into the second portion 28*b* of the bypass flow path 28. At this time, in the shuttle valve 32, as shown in FIG. 6, the valve element 66 is biased downward, communication between the first inlet 32*a* and the outlet 32*c* is blocked, and the second inlet 32*b* and the outlet 32*c* communicate with each other. As shown in FIG. 2, the exhaust air that has passed through the shuttle valve 32 passes through the pilot air adjustment part 30 as pilot air, and is supplied to the switching valve 26. The flow rate of the pilot air is variably adjusted by the second throttle valve 31*a*.

Thereafter, accompanying movement of the piston 16, the pressure of the pilot air in the rod side switching valve 26 gradually increases. Then, at a predetermined timing at which the piston 16 approaches the stroke end, the rod side switching valve 26 switches from the first position to the second position due to the pressure of the pilot air, against the elastic force of the return spring 26*a*.

Figure 7:
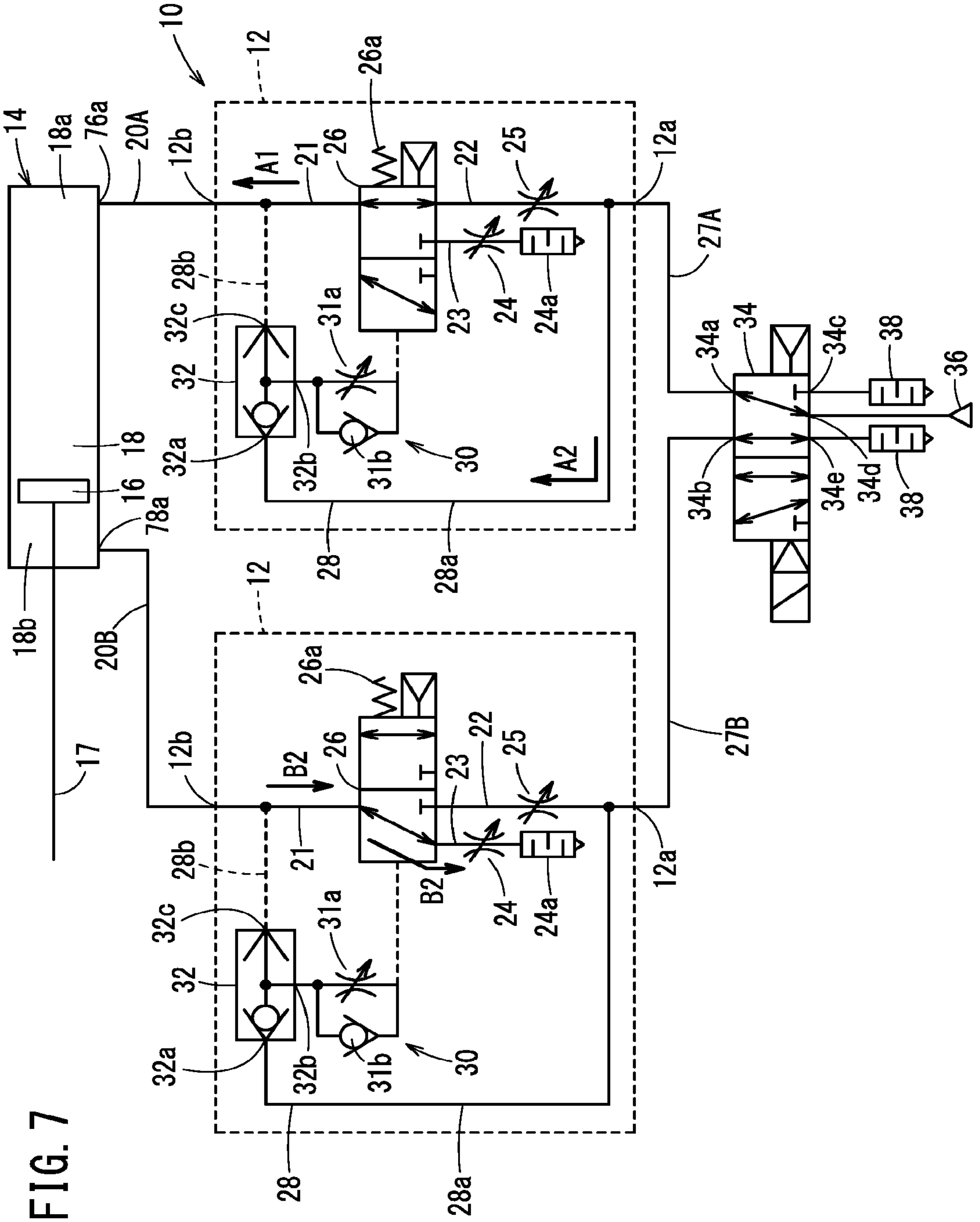
FIG. 7 is a fluid circuit diagram showing a state in which a rod side switching valve shown in FIG. 2 is switched to a second position.

As shown in FIG. 7, at the second position of the rod side switching valve 26, the cylinder flow path 21 and the auxiliary flow path 23 communicate with each other. The exhaust air from the air cylinder 14 flows as shown by the arrow B2, and while being regulated by the first throttle valve 24 of the auxiliary flow path 23, is discharged from the exhaust port 24*a*. Since the flow rate of the first throttle valve 24 is less than the flow rate of the third throttle valve 25, the flow rate of the exhaust air is strongly throttled at the timing at which the piston 16 approaches the stroke end, whereby the speed of the piston 16 decreases. Consequently, shocks in the air cylinder 14 when the piston 16 reaches the stroke end are mitigated.

When the piston 16 is stopped, inflowing of the exhaust air into the flow rate controller 12 on the rod side ceases, and the pilot air of the switching valve 26 is discharged to the cylinder flow path side through the check valve 31*b* of the pilot air adjustment part 30. Then, the switching valve 26 is returned to the first position by the elastic force of the return spring 26*a*.

In accordance with the foregoing, the operating stroke of the drive device 10 of the air cylinder 14 comes to an end. Thereafter, by the operation switching valve 34 being switched from the first position to the second position, the return stroke is carried out. In the return stroke, the exhaust air flows to the head side flow rate controller 12, and the high pressure air flows to the rod side flow rate controller 12. The operations of the drive device 10 in the return stroke simply involve a switching of places in the operating stroke between the head side flow rate controller 12 and the rod side flow rate controller 12, and since the operations in the return stroke and the operations in the operating stroke are basically the same, a description of such operations will be omitted.

The flow rate controller 12 and the drive device 10 of the present embodiment realize the following advantageous effects.

In the conventional flow rate controller, when the pressure of the pilot air in the switching valve falls below 0.4 MPa, a situation has occurred in which the flow rate of the pilot air passing through the throttle valve rapidly decreases. For this reason, release of the pilot air becomes impossible, and a problem occurs in that the switching valve cannot be switched at an intended timing.

In contrast thereto, the flow rate controller 12 according to the present embodiment comprises the cylinder flow path 21 communicating with a port of the air cylinder 14, the main flow path 22 that supplies and discharges air to and from the cylinder flow path 21, the auxiliary flow path 23 including the first throttle valve 24 and allowing the exhaust air discharged from the air cylinder 14 to pass therethrough with a smaller flow rate than that of the main flow path 22, the switching valve 26 connected between the cylinder flow path 21, and the main flow path 22 and the auxiliary flow path 23, and switched between the first position in which the cylinder flow path 21 is allowed to communicate with the main flow path 22, and the second position in which the cylinder flow path 21 is allowed to communicate with the auxiliary flow path 23, and the pilot air adjustment part 30 that guides a portion of the exhaust air in the cylinder flow path 21 to the switching valve 26 as pilot air, wherein the switching valve 26 is switched from the first position to the second position due to a rise in the pressure of the pilot air, and the pilot air adjustment part 30 includes the second throttle valve 31*a* that regulates the inflowing speed at which the pilot air flows into the switching valve 26.

With the flow rate controller 12 according to the present embodiment, a portion of the exhaust air is used as pilot air, and the pilot air adjustment part 30 functions as a meter-in speed controller that regulates the pilot air flowing into the switching valve 26. Therefore, a pressure that is greater than or equal to 0.4 MPa continuously acts on the second throttle valve 31*a*, and it is possible to prevent a decrease in the flow rate of the pilot air passing through the second throttle valve 31*a*. As a result, in the flow rate controller 12, the timing at which the switching valve 26 is operated is stabilized.

Further, the flow rate controller 12 of the present embodiment is also effective when connected to an air cylinder having a shock absorbing structure such as an air cushion. In this case, the flow rate of the air can be throttled from a time before the shock absorbing structure operates, and the load acting on the shock absorbing structure can be reduced. Further, in the case of the air cylinder being operated at a high speed, it becomes difficult for a repulsive force of the shock absorbing structure such as the air cushion to be adjusted at the end of the stroke, and the piston tends to vibrate unintentionally and bound near the end of the stroke. In such a case, if the flow rate controller 12 is provided in the drive device 10, the flow rate of the air can be throttled before the shock absorbing structure operates, whereby the shock absorbing structure operates smoothly, and the occurrence of bounding can be prevented.

In the above-described flow rate controller 12, there may further be provided the bypass flow path 28 that bypasses the switching valve 26 and connects the cylinder flow path 21 and the main flow path 22, and the shuttle valve 32 provided between the bypass flow path 28 and the pilot air adjustment part 30, wherein, in the case that the pressure in the main flow path 22 is higher than the pressure in the cylinder flow path 21, the shuttle valve 32 may allow the main flow path 22 and the cylinder flow path 21 to communicate with each other while blocking communication between the pilot air adjustment part 30 and the bypass flow path 28, whereas in the case that the pressure in the cylinder flow path 21 is higher than the pressure in the main flow path 22, the shuttle valve 32 may allow the cylinder flow path 21 and the pilot air adjustment part 30 to communicate with each other while blocking communication between the main flow path 22 and the cylinder flow path 21.

In accordance with these features, since the high pressure air is capable of flowing into the cylinder flow path 21 not only through the main flow path 22 but also through the bypass flow path 28, responsiveness to high speed operation of the air cylinder 14 is facilitated.

In the above-described flow rate controller 12, there may be included the third throttle valve 25 that regulates the flow rate of the air flowing in the main flow path 22, and the bypass flow path 28 may bypass the switching valve 26 and the third throttle valve 25, and connect the main flow path 22 and the cylinder flow path 21. In this manner, by providing the third throttle valve 25, the flow rate of the exhaust air flowing through the main flow path 22 can be regulated, and the operating speed of the piston 16 of the air cylinder 14 can be adjusted by the third throttle valve 25. Further, since the bypass flow path 28 is provided so as to bypass the switching valve 26 and the third throttle valve 25, the high pressure air is not regulated by the flow rate of the third throttle valve 25, and responsiveness to high speed operation of the air cylinder 14 is therefore facilitated.

In the above-described flow rate controller 12, there may further be provided the housing 40 that accommodates the switching valve 26, the pilot air adjustment part 30, the first throttle valve 24, the bypass flow path 28, and the shuttle valve 32, wherein the housing 40 may include the valve port 12*a* communicating with the main flow path 22, the exhaust port 24*a* communicating with the auxiliary flow path 23, and the cylinder port 12*b* communicating with the cylinder flow path 21. In accordance with the above-described configuration, main portions of the flow rate controller 12 can be provided integrally within the housing 40. Further, the flow rate controller 12 can be attached to the air cylinder 14 merely by connecting the pipes to the valve port 12*a* and the cylinder port 12*b*.

In the above-described flow rate controller 12, the switching valve 26 may include the spool guide hole 42 including the first communication groove 50 communicating with the valve port 12*a*, the second communication groove 52 communicating with the first throttle valve 24, and the third communication groove 54 communicating with the cylinder port 12*b*, the spool 46 disposed in the spool guide hole 42 slidably along the axial direction, and including the first sealing wall 46*c* for blocking communication between the second communication groove 52 and the third communication groove 54 at the first position, the second sealing wall 46*d* for blocking communication between the first communication groove 50 and the third communication groove 54 at the second position, and the recesses 47*a* and 47*c* formed between the first sealing wall 46*c* and the second sealing wall 46*d*, allowing the first communication groove 50 and the third communication groove 54 to communicate with each other at the first position, and allowing the second communication groove 52 and the third communication groove 54 to communicate with each other at the second position, the return spring 26*a* that biases the spool 46 to the side of the first position, and the piston member 45 which displaces the spool 46 to the second position under an action of the pilot air flowing in from the cylinder port 12*b*.

The above-described drive device 10 comprises: the high pressure air supply source 36 that supplies the high pressure air to the air cylinder 14; the exhaust port 38 that discharges the exhaust air of the air cylinder 14; the flow rate controller 12 including the cylinder flow path 21 communicating with a port of the air cylinder 14, the main flow path 22 that supplies and discharges air to and from the cylinder flow path 21, the auxiliary flow path 23 including the first throttle valve 24 and allowing the exhaust air discharged from the air cylinder 14 to pass therethrough with a smaller flow rate than that of the main flow path 22, the switching valve 26 connected between the cylinder flow path 21, and the main flow path 22 and the auxiliary flow path 23, and switched between the first position in which the cylinder flow path 21 is allowed to communicate with the main flow path 22, and the second position in which the cylinder flow path 21 is allowed to communicate with the auxiliary flow path 23, and the pilot air adjustment part 30 that guides a portion of the exhaust air in the cylinder flow path 21 to the switching valve 26 as pilot air, wherein the switching valve 26 is switched from the first position to the second position due to a rise in the pressure of the pilot air, and the pilot air adjustment part 30 includes the second throttle valve 31*a* that regulates the inflowing speed at which the pilot air flows into the switching valve 26; and the operation switching valve 34 that is connected to one end of the high pressure air supply source 36, one end of the exhaust port 38, and one end of the main flow path 22, and that switches and thereby allows either the high pressure air supply source 36 or the exhaust port 38 to communicate with the main flow path 22.

In accordance with the above-described drive device 10, by providing the flow rate controller 12, the timing at which the switching valve 26 is operated can be stabilized.

In the above-described drive device 10, the flow rate controller 12 may be connected to the head side port 76*a* of the air cylinder 14 and to the rod side cylinder flow path 21 that communicates with the rod side port 78*a*. In accordance with this feature, impacts at the stroke end in both the operating stroke and the return stroke can be mitigated.

Although a description of a preferred embodiment of the present invention has been presented above, it should be understood that the present invention is not limited to the above-described embodiment, but various changes and modifications may be made within a range that does not deviate from the essence and gist of the present invention.

The invention claimed is:

1. A flow rate controller, comprising:

a cylinder flow path communicating with a port of an air cylinder;

a main flow path configured to supply high pressure air and discharge exhaust air to and from the cylinder flow path;

an auxiliary flow path disposed in parallel with the main flow path and including a first throttle valve configured to throttle a flow rate of the air to a flow rate less than that in the main flow path;

a switching valve incorporated in the main flow path and the auxiliary flow path, the switching valve being configured to be switched between a first position in which the cylinder flow path is allowed to communicate with the main flow path, and a second position in which the cylinder flow path is allowed to communicate with the auxiliary flow path; and a pilot air adjustment part configured to guide a portion of exhaust air in the cylinder flow path to the switching valve as pilot air, wherein the pilot air adjustment part includes a second throttle valve configured to regulate an inflowing speed at which the pilot air flows into the switching valve, and the switching valve is switched from the first position to the second position due to a rise in a pressure of the pilot air, further comprising:

a bypass flow path configured to bypass the switching valve and connect the cylinder flow path and the main flow path; and a shuttle valve including a first inlet, a second inlet, and an outlet, wherein a first portion of the bypass flow path that communicates with the main flow path is connected to the first inlet, a second portion of the bypass flow path that communicates with the cylinder flow path is connected to the outlet, and the pilot air adjustment part is connected to the second inlet, wherein, when a pressure in the main flow path becomes higher than a pressure in the cylinder flow path, the shuttle valve closes the second inlet to allow the first inlet and the outlet to communicate with each other, and when the pressure in the cylinder flow path becomes higher than the pressure in the main flow path, the shuttle valve closes the first inlet to allow the second inlet and the outlet to communicate with each other.

2. The flow rate controller according to claim 1, wherein the main flow path includes a third throttle valve, and the bypass flow path bypasses the switching valve and the third throttle valve, and connects the main flow path and the cylinder flow path.

3. The flow rate controller according to claim 1, further comprising a housing configured to accommodate the switching valve, the pilot air adjustment part, the first throttle valve, the bypass flow path, and the shuttle valve, wherein the housing includes:

a valve port communicating with the main flow path;

an exhaust port communicating with the auxiliary flow path; and a cylinder port communicating with the cylinder flow path.

4. The flow rate controller according to claim 3, wherein the switching valve comprises:

a spool guide hole including a first communication groove communicating with the valve port, a second communication groove communicating with the first throttle valve, and a third communication groove communicating with the cylinder port;

a spool disposed in the spool guide hole slidably along an axial direction, and including a first sealing wall configured to block communication between the second communication groove and the third communication groove at the first position, a second sealing wall configured to block communication between the first communication groove and the third communication groove at the second position, and recesses formed between the first sealing wall and the second sealing wall, and configured to allow the first communication groove and the third communication groove to communicate with each other at the first position, and to allow the second communication groove and the third communication groove to communicate with each other at the second position;

a return spring configured to bias the spool to a side of the first position; and a piston member configured displace the spool to the second position under an action of the pilot air flowing in from the cylinder port.

5. A drive device, comprising:

a high pressure air supply source configured to supply high pressure air to an air cylinder;

an exhaust port configured to discharge exhaust air of the air cylinder;

a flow rate controller including a cylinder flow path communicating with a port of the air cylinder, a main flow path configured to supply high pressure air and discharge exhaust air to and from the cylinder flow path, an auxiliary flow path disposed in parallel with the main flow path and including a first throttle valve configured to throttle a flow rate of the air to a flow rate less than that in the main flow path, a switching valve incorporated in the main flow path and the auxiliary flow path, the switching valve being configured to be switched between a first position in which the cylinder flow path is allowed to communicate with the main flow path, and a second position in which the cylinder flow path is allowed to communicate with the auxiliary flow path, and a pilot air adjustment part configured to guide a portion of the exhaust air in the cylinder flow path to the switching valve as pilot air; and an operation switching valve connected to one end of the high pressure air supply source, one end of the exhaust port, and one end of the main flow path, and configured to switch and thereby allow either the high pressure air supply source or the exhaust port to communicate with the main flow path, wherein the pilot air adjustment part includes a second throttle valve configured to regulate an inflowing speed at which the pilot air flows into the switching valve, and the switching valve is switched from the first position to the second position due to a rise in a pressure of the pilot air, further comprising:

a bypass flow path configured to bypass the switching valve and connect the cylinder flow path and the main flow path; and a shuttle valve including a first inlet, a second inlet, and an outlet, wherein a first portion of the bypass flow path that communicates with the main flow path is connected to the first inlet, a second portion of the bypass flow path that communicates with the cylinder flow path is connected to the outlet, and the pilot air adjustment part is connected to the second inlet, wherein, when a pressure in the main flow path becomes higher than a pressure in the cylinder flow path, the shuttle valve closes the second inlet to allow the first inlet and the outlet to communicate with each other, and when the pressure in the cylinder flow path becomes higher than the pressure in the main flow path, the shuttle valve closes the first inlet to allow the second inlet and the outlet to communicate with each other.

6. The drive device according to claim 5, wherein the flow rate controller is connected to a head side port of the air cylinder, and a rod side port of the air cylinder.

* * * * *